United States Patent [19]

Gobran

[11] 4,260,659
[45] Apr. 7, 1981

[54] PRESSURE-SENSITIVE TAPE HAVING A PLURALITY OF ADHESIVE LAYERS

[75] Inventor: Ramsis Gobran, Roseville, Minn.

[73] Assignee: Minnesota Mining and Manufacturing Company, St. Paul, Minn.

[21] Appl. No.: 49,415

[22] Filed: Jun. 18, 1979

Related U.S. Application Data

[63] Continuation-in-part of Ser. No. 897,852, Apr. 19, 1978, abandoned.

[51] Int. Cl.³ .......................... C09J 7/02; B32B 7/02; B32B 25/00; B32B 27/30
[52] U.S. Cl. .................................. 428/217; 428/220; 428/246; 428/261; 428/262; 428/263; 428/336; 428/339; 428/354; 428/356; 427/208.8
[58] Field of Search ................. 428/40, 212, 214, 217, 428/218, 343, 354, 220, 246, 261, 262, 263, 336, 339, 356; 427/207 D, 207 R, 207.1, 208.8

[56] References Cited

U.S. PATENT DOCUMENTS

| | | | |
|---|---|---|---|
| Re. 24,906 | 12/1960 | Ulrich | 206/59 |
| 997,125 | 7/1911 | Gleason | 428/212 |
| 2,652,351 | 9/1953 | Gerhardt | 428/355 |
| 3,017,297 | 1/1962 | Newman et al. | 427/153 X |
| 3,032,438 | 5/1962 | Gaynes et al. | 427/208.8 X |
| 3,121,021 | 2/1964 | Copeland | 428/219 |
| 3,161,533 | 12/1964 | Gaynes | 366/2 |
| 3,239,478 | 3/1966 | Harlan | 260/27 BB |
| 3,322,856 | 5/1967 | Holden et al. | 525/99 |
| 3,340,088 | 9/1967 | Pennisi et al. | 428/353 |
| 3,630,980 | 12/1971 | Russell | 200/27 EV |
| 3,658,740 | 4/1972 | Marrs et al. | 260/119 R X |
| 3,753,936 | 8/1973 | Marrs | 260/876 B |
| 3,784,587 | 1/1974 | Chambers | 260/876 B |
| 3,811,438 | 5/1974 | Economou | 128/156 |
| 3,812,005 | 5/1974 | Katagiri et al. | 156/334 |
| 3,885,559 | 5/1975 | Economou | 128/156 |
| 4,024,312 | 5/1977 | Korpman | 428/343 |
| 4,028,292 | 6/1977 | Korpman | 260/27 R |
| 4,037,016 | 7/1977 | Habeck et al. | 428/349 |
| 4,046,838 | 9/1977 | Feeney | 260/876 B |
| 4,074,004 | 2/1978 | Bateson et al. | 428/355 |
| 4,112,177 | 9/1978 | Salditt et al. | 427/207 D X |

FOREIGN PATENT DOCUMENTS

1193626 6/1970 United Kingdom .
1193627 6/1970 United Kingdom .

Primary Examiner—George F. Lesmes
Assistant Examiner—Alexander S. Thomas
Attorney, Agent, or Firm—Cruzan Alexander; Donald M. Sell; Richard E. Brink

[57] ABSTRACT

A pressure-sensitive adhesive tape which not only conforms well and adheres quickly to irregular substrates but also possesses excellent shear adhesion performance. These properties, normally mutually exclusive, are achieved through use of superposed plural pressure-sensitive adhesive strata, the outer stratum being significantly softer than the one lying immediately beneath it.

8 Claims, 2 Drawing Figures

4,260,659

PRESSURE-SENSITIVE TAPE HAVING A PLURALITY OF ADHESIVE LAYERS

CROSS-REFERENCE TO RELATED APPLICATION

This is a continuation-in-part of copending application Ser. No. 897,852, filed Apr. 19, 1978, abandoned.

BACKGROUND OF THE INVENTION

This invention relates to normally tacky and pressure-sensitive adhesive tape and is particularly concerned with a novel composite pressure-sensitive adhesive layer.

Users of pressure-sensitive adhesive tape have frequently sought a product which possesses the combined characteristics of (1) good adhesion to irregular substrates and (2) good resistance to failure when subject to shearing forces after application. These two desiderata are essentially mutually exclusive, since a soft adhesive is required for conformability but a hard, or firm, adhesive is required for good shear properties. Thus, while adhesives possessing intermediate properties have been made (cf., e.g., U.S. Pat. No. 2,956,904, which teaches the use of an electron beam to crosslink an adhesive, and U.S. Pat. No. 3,658,740 which describes the blending of a tackifier with two types of rubbery copolymer), it has generally been considered impossible to obtain a tape in which the adhesive simultaneously possesses both good conformability and good shear properties.

One application for normally tacky and pressure-sensitive adhesive tape which imposes the conflicting demands just discussed is found in tape used for diaper closures. Such tape must bond quickly and firmly to the irregular surfaces of conventional cloth diapers or to the frequently powder-contaminated polyethylene outer face of disposable diapers. On the other hand, the stresses imposed on a tape product used as a diaper closure are such that almost all adhesives which are considered "soft" (a characteristic which is required for conformability and contamination tolerance) quickly fail in use because of the shearing action applied to the adhesive layer.

Normally tacky and pressure-sensitive adhesives of certain water-resistant types have also been used in the manufacture of identification labels for shirts and other launderable garments; see, e.g., U.S. Pat. No. 4,074,004. Again, while softness of the pressure-sensitive adhesive is essential to obtain conformability to the cloth, the stresses imparted during washing-drying cycles tend to loosen the edges of a fabric label having a soft adhesive and hence to result in a shorter life for the identification label than is desirable. A hard adhesive, on the other hand, lacks sufficient conformability to develop adequate initial adhesion and hence peels off readily. It has been extremely difficult to balance adhesive properties to arrive at a label which not only adheres well but also resists the shearing stress encountered in normal laundering.

SUMMARY

The present invention provides a novel but simple pressure-sensitive adhesive tape construction which simultaneously possesses the normally mutually exclusive properties of (1) excellent adhesion and conformability, and (2) excellent shear. Tapes made in accordance with the invention thus find utility in a wide variety of mounting, fastening, laminating and other applications; these tapes are particularly suited, however, for use in the preparation of diaper closures and identification labels for washable garments.

In accordance with the invention, a sheet backing material is provided with a layer of normally tacky and pressure-sensitive adhesive which comprises a plurality of pressure-sensitive adhesive strata, the strata for a given tape being part of the same general adhesive family but the exposed adhesive stratum being significantly softer than the immediately underlying stratum. Thus, for example, while both strata may be rubber-resin pressure-sensitive adhesives, both may be normally tacky and pressure-sensitive acrylate copolymer adhesives, etc., it is not generally wise to combine rubber-resin and acrylate adhesives.

The "softness" or "hardness" of the adhesives comprising the pressure-sensitive adhesive layer is measured in terms of "shear creep compliance", using a test to be described in more detail. The exposed first adhesive stratum has a 10-second shear creep compliance ($J_{10}$) of at least about $3.5 \times 10^{-6}$ (preferably at least about $7 \times 10^{-6}$) cm$^2$/dyne, while the underlying adhesive stratum has a $J_{10}$ value of no more than about $2.5 \times 10^{-6}$ cm$^2$/dyne.

Others have previously made pressure-sensitive adhesive tape employing as a primer a resin-tackified natural rubber latex blended with chloroprene-acrylonitrile copolymer (see, e.g., U.S. Pat. No. 3,340,088), but the primer is applied in an extremely thin layer and in any event it is not itself a pressure-sensitive adhesive composition.

For some purposes (e.g., bonding two fabrics together), it is desirable to have a 3-stratum adhesive layer in which a comparatively hard adhesive stratum is sandwiched between two comparatively soft adhesive strata.

Speaking in general terms, the thickness of each adhesive stratum can range between about 5 and 60 micrometers (preferably between about 15 and 45 micrometers). The thickness of the composite adhesive layer is about 40-120 micrometers for a 2-stratum product and 60-180 micrometers for a 3-stratum product.

BRIEF DESCRIPTION OF THE DRAWING

Understanding of the invention will be enhanced by referring to the accompanying drawing, in which:

In FIG. 1, film backing 11 is provided with normally tacky and pressure-sensitive adhesive layer 12, comprising comparatively hard pressure-sensitive adhesive stratum 13 and comparatively soft adhesive stratum 14.

In FIG. 2, tape 20 comprises cloth backing 21, on one side of which is coated normally tacky and pressure-sensitive adhesive layer 22, comprising relatively hard adhesive stratum 24 sandwiched between relatively soft adhesive strata 23 and 25.

DESCRIPTION OF TEST PROCEDURES

Creep Compliance of Adhesive Layer

Figure 1:
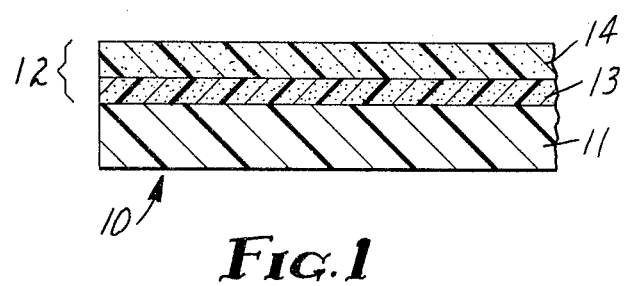
FIG. 1 depicts, in greatly enlarged cross-section, a tape which is useful as a diaper closure.
Figure 2:
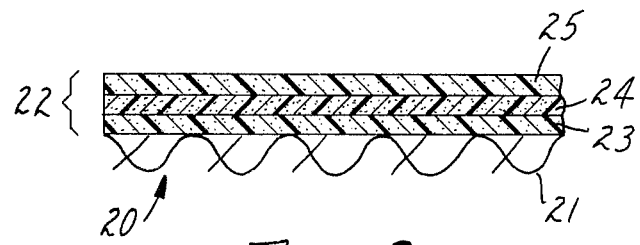
FIG. 2 shows, likewise in greatly enlarged cross-section, a tape construction having particular utility as a garment label.

In *Properties and Structure of Polymers*, John Wiley & Sons, Inc., 1960, Chapter II, Section 6, Tobolsky discusses the five regions of viscoelastic behavior possessed by linear amorphous polymers, e.g., polystyrene.

He characterizes the elastic properties of a polymer by its tensile relaxation modulus, $E_r(t)$, which is obtained by measuring stress as a function of time in a sample maintained at constant extension and constant temperature. As a polymer is heated, it successively passes through regions which can be designated as glassy, transition, rubbery plateau, rubbery flow, and liquid flow. Only the latter two regions are of significance to the present invention. For a 10-second reference time, the dividing line between the rubbery plateau and the rubbery flow regions $E_r(10)$, is approximately $2.5 \times 10^6$ dynes/cm$^2$. In the rubbery flow region, the shear modulus, $G_{r(10)}$, is approximately one-third the tensile modulus, or $0.83 \times 10^6$ dynes/cm$^2$; shear creep compliance $J_{r(10)}$, which is the reciprocal of the shear modulus, is thus $1.2 \times 10^{-6}$ cm$^2$/dyne at the boundary between the rubbery plateau and the rubbery flow regions.

In measuring shear creep compliance, the adhesive to be tested is spun-cast on a smooth film of polytetrafluoroethylene to a thickness of 500 micrometers. Two test pieces of equal area are die cut from the adhesive sheet and placed in a parallel plate shear creep plastometer*, one piece being on each side of the center plate, with an outer plate contacting the exposed surface of each. Screws connecting the two outer plates are then tightened so as to compress the adhesive layers 10%. The parallel plates are placed in horizontal arrangement in an oven and one end of the center plate connected to a linear displacement voltage transformer, which in turn is connected to a chart recorder. A hook is attached to the opposite end of the center plate, with a flexible wire extending from the hook over a pulley. The outer plates are held in a fixed position. The oven is raised to the desired temperature and stabilized there at $\pm 0.5°$ C., after which a suitable weight (20 to 1,500 gms, whatever will both measurably deform the sample and remain within the linearity limit of the sample) is attached to the free end of the wire, and the chart recorder started. From the chart recorder the time and displacement can be read and the shear creep compliance, J, of the adhesive at a given temperature calculated from the equation $$J(t) = 2AX_i/hf,$$

where t is the time at which the measurement is taken, A is the area of one face of one of the adhesive samples, h is the thickness of one of the adhesive samples, $X_i$ is the displacement at time t (where $X_i$ is less than h), and F is the force due to gravitational acceleration of the mass attached to the wire connected to the middle plate. When A is expressed in cm$^2$, h in cm, $X_i$ in cm, and F in dynes, J(t) is given in cm$^2$/dyne. It has been found that an adhesive has satisfactory "softness" or shear creep compliance to function as an upper adhesive stratum, in accordance with the invention, if its 10-second shear creep compliance value, J(10), is at least about $3.5 \times 10^{-6}$ cm$^2$/dyne. Similarly an adhesive has adequate "hardness" to function as a lower adhesive stratum if its J(10) value is no more than about $2.5 \times 10^{-6}$ cm$^2$/dyne.

*see, e.g., Ferry, John D., *Viscoelastic Properties of Polymers*, John Wiley & Sons, Inc., New York, N.Y., 1961, Chapter 6.

While the evaluation of a diaper closure tape is often highly subjective, it has been found that three specific tests can be employed to determine whether a given tape (and more particularly the pressure-sensitive adhesive) possesses the properties which recommend it for use as a contaminant-tolerant diaper closure tape. The tests will now be described in more detail.

Quick Stick

This test is a modification of Pressure-Sensitive Tape Council test PSTC-5*, which measures the ability of pressure-sensitive adhesive tape to adhere to a surface instantly, using no external pressure to secure more thorough contact. It is measured as a force resisting peeling of the tape at 90° angle from a standard surface upon which it has been adhered. In accordance with the modification, the test surface is a polyethylene film of the type commonly employed as the outer surface of disposable diaper; this film is carefully and uniformly bonded to a steel test panel. The tape is placed in contact with the polyethylene film and rolled down with a 100-gram roller at a rate of 30.5 cm/minute. The force required to remove a strip of tape at 90° from the exposed surface of the polyethylene at a rate of 30.5 cm/minute should be at least about 100 grams per centimeter width, and preferably at least about 200 grams per centimeter width.

*described in detail in "Test Methods for Pressure-Sensitive Tapes", 6th Edition, developed by the Specifications and Technical Committee of the Pressure-Sensitive Tape Council, 1201 Waukegan Road, Glenview ILL 60025.

Contamination Tolerance

This test is substantially identical to the "Quick Stick" test just described, except that the surface of the polyethylene is first covered uniformly with talc and the excess shaken off, leaving approximately 2–2.5 g/m$^2$. The force required to remove the tape from the talc-contaminated polyethylene film should be at least about 15 grams, and preferably at least about 40 grams, per centimeter width.

Shear Adhesion

In this test, a 2.54-cm wide strip of tape is obtained and the adhesive surface partially masked with paper or the like so as to leave a 2.54-cm length of adhesive exposed. The 2.54×2.54 cm square of adhesive is positioned against the polyethylene cover of a section cut from a disposable diaper, and, using a 500-gram roller, pressed into firm contact. One end of the diaper section is then gripped in a pair of jaws, the free end of the tape extending downward therefrom, and a 1,000-gram weight connected to the free end of the tape. The time required for the tape to pull free from the polyethylene film is measured in minutes. A satisfactory shear adhesion value is considered to be at least 3 minutes, preferably at least about 10 minutes.

DESCRIPTION OF THE PRESENTLY PREFERRED EMBODIMENTS

The invention will now be described with the aid of certain illustrative but non-limitative examples, all parts being by weight unless otherwise noted. The following abbreviations have been employed to refer to the various components of the adhesive:

| ABBREVIATION | Rubbery Polymers COMPONENT |
|---|---|
| K1101 | Styrene:butadiene:styrene block copolymer, having a styrene:butadiene ratio of 30:70 and a solution viscosity (25% in toluene, 23° C.) of 4,000 cps, commercially available from Shell Chemical Co. as "Kraton" 1101. |

| | -continued |
|---|---|
| K1107 | Styrene:isoprene-styrene block copolymer having a styrene:isoprene ratio of 14:86, and a Brookfield viscosity of 1600 cps at 25° C. (25% solution in toluene), commercially available from Shell Oil Company under the registered trademark "Kraton" 1107 |
| S423P | Styrene:isoprene radial block copolymer having a styrene:isoprene ratio of 16:84 and a Brookfield viscosity of 2300 cps at 25° C. (25% solution in toluene), commercially available from Phillips Petroleum Company under the registered trademark "Solprene" 423P |
| S1205 | Linear styrene:butadiene block copolymer having a styrene:butadiene ratio of 25:75, a Brookfield viscosity of 2345 cps at 25° C. (25% solution in toluene) and a molecular weight of 83,000, commercially available from Phillips Petroleum Company under the registered trademark "Solprene" 1205 |
| SMR | Natural crepe rubber |

| | Tackifier Resins |
|---|---|
| ABBREVIATION | COMPONENT |
| α135 | Polymerized alpha-pinene having a ring-and-ball softening temperature of about 135° C., available from Hercules Incorporated as "Piccolyte" A-135 |
| B115 | Polymerized beta-pinene having a ring-and-ball softening temperature of 115–120° C., commercially available from Arizona Chemical Company under the registered trademark "Zonarez" B-115 |

| | -continued |
|---|---|
| S115 | Polymerized beta-pinene having a ring-and-ball softening temperature of 115–120° C., commercially available from Hercules Incorporated under the registered trademark "Piccolyte" S-115 |
| W10 | Synthetic polyterpene resin having a molecular weight of 450, liquid at room temperature (ring-and-ball softening temperature of 10° C.), commercially available from The Goodyear Tire and Rubber Company under the registered trademark "Wingtack" 10. |
| W115 | Synthetic polyterpene resin having a molecular weight of 1400 and a ring-and-ball softening temperature of 115–120° C., commercially available from The Goodyear Tire and Rubber Company under the registered trademark "Wingtack" 115. |

In each example, a first normally tacky and pressure-sensitive adhesive stratum was bonded to a polypropylene film backing using conventional techniques, either coating a solution of the adhesive on the backing and then evaporating the solvent, applying the adhesive as a hot melt, or forming the adhesive on a release liner and transferring it to the polypropylene film. In each case, the thickness of the first adhesive stratum, when dry, was on the order of 15–45 micrometers. The second adhesive stratum was then bonded over the first in similar manner, applying a sufficient quantity to leave an overall adhesive layer thickness of approximately 60 micrometers.

TABLE I

| | | | Lower Stratum | | |
|---|---|---|---|---|---|
| | | | | Tackifier | |
| Example No. | Thickness, micrometers | Rubbery Polymer | Type | Parts/ 100 Parts Rubber | Shear Creep Compliance, $cm^2/dyne \times 10^{-6}$ |
| 1 | 32 | K1101 (25) S1205 (75) | α-135 | 100 | 1.8 |
| 2 | 39 | SMR | S115 or B115 | 110 | 1.7 |
| 3 | 22 | K1101 (25) S1205 (75) | α-135 | 100 | 1.8 |
| 4 | 29 | K1107 | W115 | 100 | — |
| 5 | 34 | K1107 | W115 W10 | 100 50 | 1.7 |
| 6 | 33 | K1107 | W115 W10 | 100 50 | 1.7 |
| Comparison 7 | 17 | K1107 | W115 W10 | 100 50 | 1.7 |
| Comparison 8 | 24 | K1107 | W115 W10 | 100 50 | 1.7 |
| 9 | 32 | S423P | W115 W10 | 100 50 | — |

| | | | Upper Stratum | | | | | |
|---|---|---|---|---|---|---|---|---|
| | | | | Tackifier | | | | |
| Example No. | Thickness, micrometers | Rubbery Polymer | Type | Parts 100 Parts Rubber | Shear Creep Compliance, $cm^2/dyne \times 10^{-6}$ | Quick Stick, g/cm | Contamination Tolerance, g/cm | Shear Adhesion, Minutes |
| 1 | 25 | K1107 | W115 W10 | 100 500 | 28 | 361 | 30 | — |
| 2 | 14 | SMR | W115 W10 | 182 110 | 10 | 228 | 10 | — |
| 3 | 24 | K1107 | W115 W10 | 150 500 | — | 248 | 35 | — |
| 4 | 33 | K1107 | W115 W10 | 250 500 | — | 271 | 15 | 62 |
| 5 | 34 | K1107 | W115 W10 | 150 500 | — | 218 | 30 | 7 |
| 6 | 27 | K1107 | W115 | 300 | 27 | 365 | 94 | 60 |

TABLE I-continued

| | | | | | | | | |
|---|---|---|---|---|---|---|---|---|
| Comparison | 60 | K1107 | W10 W115 | 500 150 | — | 221 | 81 | 0.9 |
| 7 | 43 | K1107 | W10 W115 | 500 150 | — | 199 | 21 | 3 |
| Comparison | 60 | K1107 | W10 W115 | 500 100 | 28 | 201 | 37 | 0.6 |
| 8 | 35 | K1107 | W10 W115 | 500 100 | 28 | 143 | 18 | 3 |
| 9 | 24 | S423P | W10 W115 W10 | 500 300 500 | — | 199 | 19 | 28 |

EXAMPLE 10

A transfer tape was prepared by coating the "hard" and "soft" adhesives of Example 7 on separate silicone-coated release liner sheets to form strata having respective thicknesses of 33 and 40 micrometers and thereafter laminating the two adhesives to each other. If desired, 3-stratum adhesives can be prepared by laminating a second "soft" adhesive stratum to the opposite face of the "hard" adhesive stratum. The 2- or 3-stratum adhesive layer can then be transferred to a substrate, the release liner removed, and another substrate adhered to the newly exposed adhesive surface in the manner well-known for transfer tapes having a one-stratum adhesive layer.

Multiple-layer acrylate adhesives are particularly suited for use in identification label tape for garments made of several different fabrics, where they are capable of remaining firmly bonded after multiple wash-dry cycles, as an aid to evaluating performance under wet conditions, the following test is utilized:

Wet Performance

Tape is prepared by coating a lightly creped neoprene beater-treated semi-bleached fiber paper backing weighing about 105 g/m² with a solution of pressure-sensitive adhesive and evaporating the solvent to leave 58 g/m² of adhesive solids. To determine the ability of the tape to adhere to fabrics under wet conditions, a 2.54-cm wide strip of the tape is applied to a 2-ply 80 grade cheese cloth which has been doubled over on itself, the tape overlapping the cheese cloth to provide 6.45 cm² cloth contact and extending beyond the folded edge of the cheese cloth. The tape is bonded firmly to the cheese cloth by twice rolling it with 2-kg automated roller traveling at about 30 cm per minute. After rolling, the samples are allowed to remain for a period of one-half hour and then immersed for one hour in a jar containing distilled water. The taped sample is then removed and subjected to dynamic shear measured as the maximum value obtained when the folded cheese cloth is gripped by the upper jaw of a tensile testing machine and the extended strip of tape by the lower jaws, separating them at a rate of approximately 5 cm/minute. A value of about 140 g/cm², and preferably about 200 g/cm², is considered necessary for the adhesive to be deemed satisfactory for use as a label adhesive. The average of three samples is reported as the wet shear value.

Table II shows the performance of normally tacky and pressure-sensitive adhesive tapes which were made in substantially the same way as the tapes in Table I except that each of the two adhesives was an acrylate copolymer, the lower adhesive being prepared generally as taught in U.S. Pat. No. Re. 24,906 and the upper adhesive being prepared generally as taught in U.S. Pat. No. 4,074,004, the disclosures of both being incorporated herein by reference. The following abbreviations for the various monomers are employed:

| ABBREVIATION | COMPONENT |
|---|---|
| AA | acrylic acid |
| IOA | iso-octyl acrylate |
| AAm | acrylamide |

TABLE II

| | Lower Stratum | | | Upper Stratum | | | |
|---|---|---|---|---|---|---|---|
| Example No. | Acrylate Copolymer | I.V. in ethyl-acetate 25° C. | Shear Creep Compliance, cm²/dyne × 10⁻⁶ | Acrylate Copolymer | I.V. in tetra-hydrofuran, 25° C. | Shear Creep Compliance, cm²/dyne × 10⁻⁶ | Wet Shear, g/cm² |
| Comparison | None | — | — | 93:7 IOA:AA | 0.65 | 7.1 | 204 |
| 11 | 90:10 IOA:AA | 1.5 | 2.4 | 93:7 IOA:AA | 0.65 | 7.1 | 436 |
| 12 | 96:4 IOA:AAm | 1.4 | — | 93:7 IOA:AA | 0.95 | 3.8 | 352 |
| 13 | 96:4 IOA:AAm | 1.4 | — | 93:7 IOA:AA | 0.65 | 7.1 | 302 |

The term "tape" in the appended claims refers both to structures in which the adhesive is firmly bonded to a conventional backing and to structures in which the adhesive is removably bonded to the release-coated surface of a backing. Tapes of the latter type, commonly known as "transfer tapes", can be applied to a desired substrate and the release liner backing removed to expose the other side of the adhesive layer. A second substrate can then be adhered to the exposed surface.

I claim:

1. In a normally tacky and pressure-sensitive adhesive tape of the type wherein a layer of normally tacky and pressure-sensitive adhesive is coated over and adhered to a flexible sheet material, the improvement wherein the pressure-sensitive adhesive layer comprises a plurality of superposed and firmly united adhesive strata selected from the same general class of adhesives, each having a thickness of about 15 to 60 micrometers, the thickness of said layer being 40-120 micrometers if only two strata are present and 60-180 micrometers if three strata are present, the exposed adhesive stratum having a 10-second shear creep compliance of at least about $5\times 10^{-6}$ cm$^2$/dyne and the immediately underlying adhesive stratum having a 10-second shear creep compliance of not more than about $2\times 10^{-6}$ cm$^2$/dyne, whereby the tape has a quick stick value of at least about 100 grams per centimeter width, a shear adhesion value of at least 3 minutes, and a contamination tolerance of at least about 15 grams per centimeter width.

2. The tape of claim 1, wherein a third adhesive stratum is interposed between the backing and said underlying adhesive stratum, said third adhesive stratum having a 10-second shear creep compliance of more than $3.5\times 10^{-6}$ cm$^2$/dyne.

3. In normally tacky and pressure-sensitive adhesive tape of the type wherein a layer of normally tacky and pressure-sensitive adhesive is coated over and adhered to a flexible sheet material, the improvement wherein the pressure-sensitive adhesive layer comprises a plurality of superposed and firmly united adhesive strata selected from the same general class of adhesives, each having a thickness about 15 to 60 micrometers, the thickness of said layer being 40-120 micrometers if only two strata are present and 60-180 micrometers if three strata are present, the exposed adhesive stratum having a 10-second shear creep compliance of at least about $5\times 10^{-6}$ cm$^2$/dyne and the immediately underlying adhesive stratum having a 10-second shear creep compliance of not more than about $2\times 10^{-6}$ cm$^2$/dyne, all of said adhesive strata being rubber-resin compositions, whereby the tape has a quick stick value of at least about 100 grams per centimeter width, a shear adhesion value of at least 3 minutes, and a contamination tolerance of at least about 15 grams per centimeter width.

4. In normally tacky and pressure-sensitive adhesive tape of the type wherein a layer of normally tacky and pressure-sensitive adhesive is coated over and adhered to a flexible sheet material, the improvement wherein the pressure-sensitive adhesive layer comprises a plurality of superposed and firmly united adhesive strata selected from the same general class of adhesives and each having a thickness of about 15 to 60 micrometers, the thickness of said layer being 40-120 micrometers if only two strata are present and 60-180 micrometers if three strata are present, the exposed adhesive stratum having a 10-second shear creep compliance of at least about $5\times 10^{-6}$ cm$^2$/dyne and the immediately underlying adhesive stratum having a 10-second shear creep compliance of not more than $2\times 10^{-6}$ cm$^2$/dyne, all of said adhesive strata being acrylate compositions, whereby the tape has a quick stick value of at least about 100 grams per centimeter width, a shear adhesion value of at least 3 minutes, and a contamination tolerance of at least about 15 grams per centimeter width.

5. The tape of claim 4 wherein the acrylate compositions consist essentially of iso-octyl acrylate:acrylic acid copolymers.

6. The tape of claim 4 wherein a third adhesive stratum is interposed between the backing and said underlying adhesive stratum, said third adhesive stratum having a 10-second shear creep compliance of more than $3.5\times 10^{-6}$ cm$^2$/dyne.

7. The tape of claim 6 wherein the backing is a cloth.

8. The tape of claim 6 wherein the backing is a polymeric film.

* * * * *